T. B. Jones,
Fruit Box,
No. 83,504.                    Patented Oct. 27, 1868.
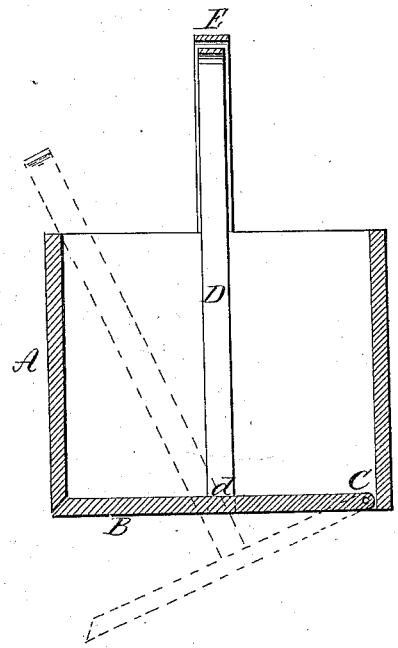
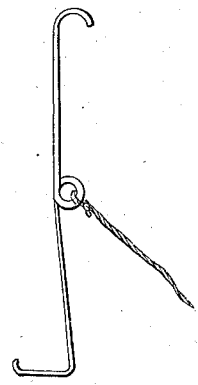
Witnesses,
Gustave Dieterich
Wm. A. Morgan
Inventor,
T. B. Jones.
per Munn & Co.
Attorneys.

United States Patent Office.

T. B. JONES, OF RADNOR, OHIO.

Letters Patent No. 83,504, dated October 27, 1868.

IMPROVED FRUIT-BOX.

The Schedule referred to in these Letters Patent and making part of the same

*To all whom it may concern:*

Be it known that I, T. B. JONES, of Radnor, in the county of Delaware, and State of Ohio, have invented a new and improved Fruit-Box or Basket; and I do hereby declare that the following is a full, clear, and exact description thereof, which will enable those skilled in the art to make and use the same, reference being had to the accompanying drawings, forming part of this specification.

This invention relates to a useful improvement in baskets or boxes for gathering, transporting, and selling fruit and other articles; and consists in hinging or pivoting the bottom of the box at one side, and operating the same by an inner bail, so that the contents of the box or basket may be discharged from the bottom instead of the top, as will be hereinafter described.

Figure 1 represents a vertical section of the box, showing the bottom closed, and also when open for the discharge of the contents, the latter being shown in red color.

Figure 2 represents a hook used in gathering fruit from trees, by which the box or basket is suspended from a limb, while the bottom is held closed.

Similar letters of reference indicate corresponding parts.

A represents the box or basket, which may be made of any suitable materials, and of any desired size and shape.

B is the bottom. The bottom is connected with the sides, either by a hinge or by pivots, as seen in the drawing, at C.

D is the bail by which the bottom is opened and closed.

This bail slips down on the inside of the box, and is attached permanently or pivoted to the edges of the bottom, as seen at d.

When the bottom is closed, the bail comes up under the bail proper of the box, which bail is marked E in the drawing, so that in carrying the box or basket, both bails are held in the hand.

When it is desired to discharge the contents, the bottom and its bail D are made to occupy the position seen in red color, when the fruit or other contents will slide out into another vessel, without being bruised or in any way injured.

An apron may be attached to the bottom, B, so that eggs or other frail articles may be delivered from the box without danger of breaking or bruising.

By the use of a hook, as seen in fig. 2, (in picking fruit from trees,) provided with a cord, as seen, the box or basket may be lowered from a tree or ladder, and the contents discharged into a barrel or other vessel without putting the operator to the trouble of descending from the tree or ladder.

The advantages of this method of constructing boxes or baskets, for the purposes mentioned, and for all purposes of a similar nature, are many, and must be obvious to all.

I claim as new, and desire to secure by Letters Patent—

A box or basket, constructed with a hinged bottom, (which bottom is provided with a bail for dropping and closing the same,) for handling fruit and other articles, constructed, arranged, and operating substantially as and for the purposes set forth.

T. B. JONES.

Witnesses:
JOHN POWELL,
WILLIAM P. HARMAN.